United States Patent [19]
Ishida

[11] 3,968,674
[45] July 13, 1976

[54] APPARATUS FOR SIMULTANEOUSLY PRODUCING INNER AND OUTER RINGS IN HOT FORMER

[75] Inventor: Tomio Ishida, Toyonaka, Japan

[73] Assignee: Sakamura Machine Co., Ltd., Osaka-Shi, Japan

[22] Filed: Aug. 5, 1975

[21] Appl. No.: 602,007

[30] Foreign Application Priority Data
Aug. 6, 1974 Japan................................ 49-90539

[52] U.S. Cl............................. 72/334; 29/148.4 R; 83/621
[51] Int. Cl.²................... B21D 28/06; B21D 45/04
[58] Field of Search............................. 72/334, 354; 29/148.4 R; 83/621, 622, 688

[56] References Cited
UNITED STATES PATENTS

| | | | |
|---|---|---|---|
| 2,880,495 | 4/1959 | Strickland...................... | 29/148.4 R |
| 2,913,811 | 11/1959 | Benson............................ | 29/148.4 R |
| 3,378,903 | 4/1968 | Cadillo........................... | 29/148.4 R |
| 3,496,619 | 2/1970 | Constant........................ | 29/148.4 R |

FOREIGN PATENTS OR APPLICATIONS

| | | | |
|---|---|---|---|
| 185,664 | 8/1955 | Austria............................ | 29/148.4 R |

Primary Examiner—Leon Gilden
Attorney, Agent, or Firm—Wenderoth, Lind & Ponack

[57] ABSTRACT

An elongated continuous steel round bar is cut to a specified length, and the cut piece is pressed by forging machine to form a workpiece including an annular portion and a smaller annular portion concentrically integrally projecting therefrom. An outer ring and an inner ring are simultaneously produced from the workpiece by an apparatus comprising an inner ring die and an outer ring die mounted on a stationary base, and an inner ring punch and outer ring punch opposing the dies and mounted on a movable ram. The inner and outer ring punches simultaneously punch out the inner and outer rings from the workpiece fitted to the inner and outer dies. In relation to this operation, a cam operates to depress a rolling member disposed in the rear of hollow portion of the inner ring die, whereby the foremost of like finished inner rings each pushed into the hollow portion of the inner ring die at every stroke of the ram is allowed to drop through the die assembly and is thereby automatically withdrawn.

5 Claims, 9 Drawing Figures

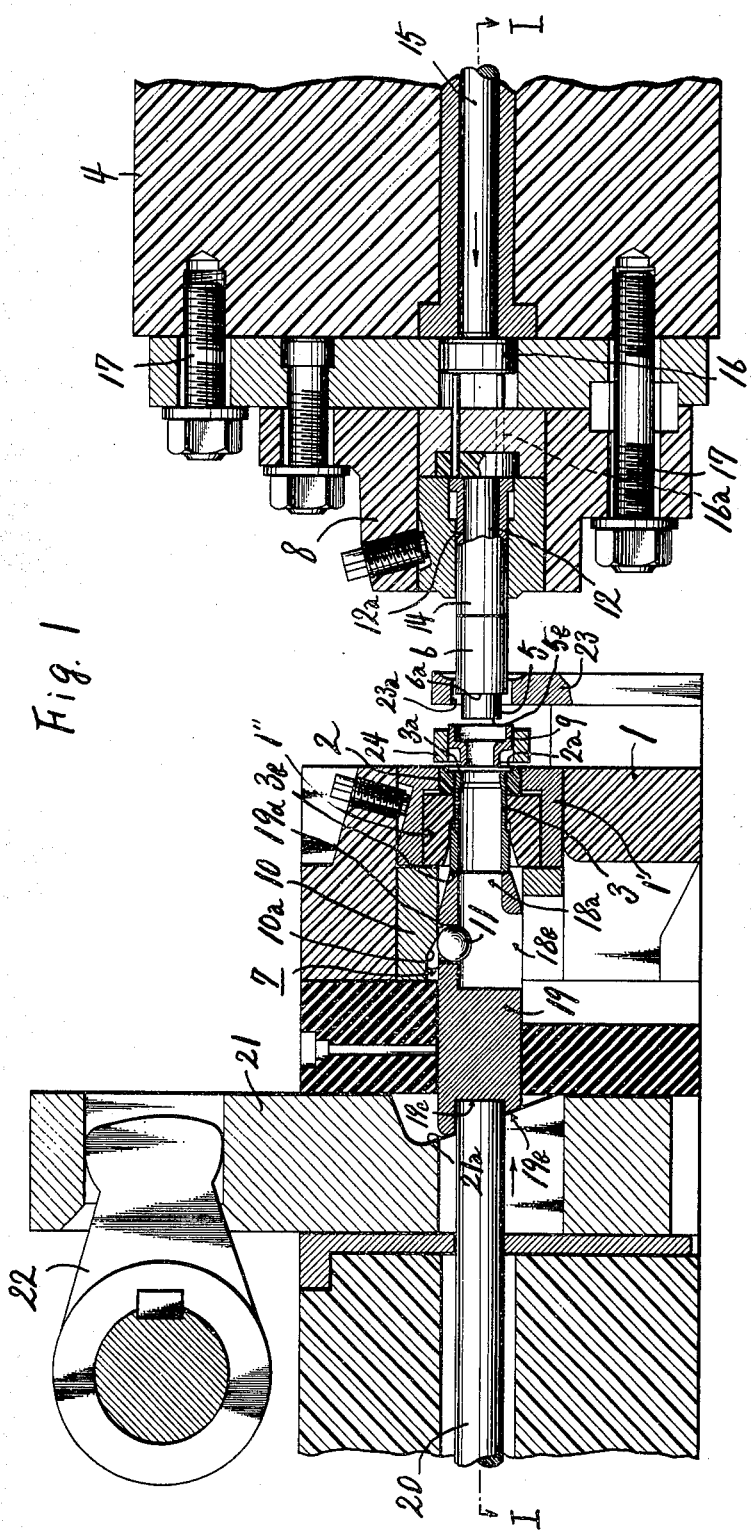
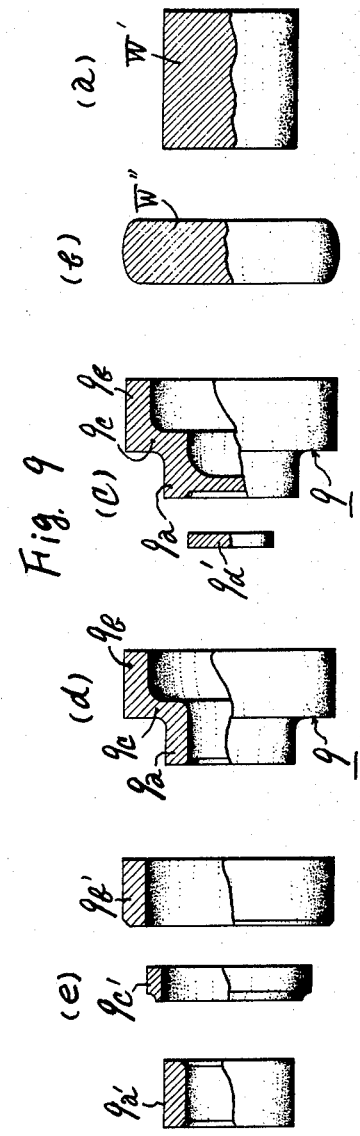
Fig. 1
Fig. 9

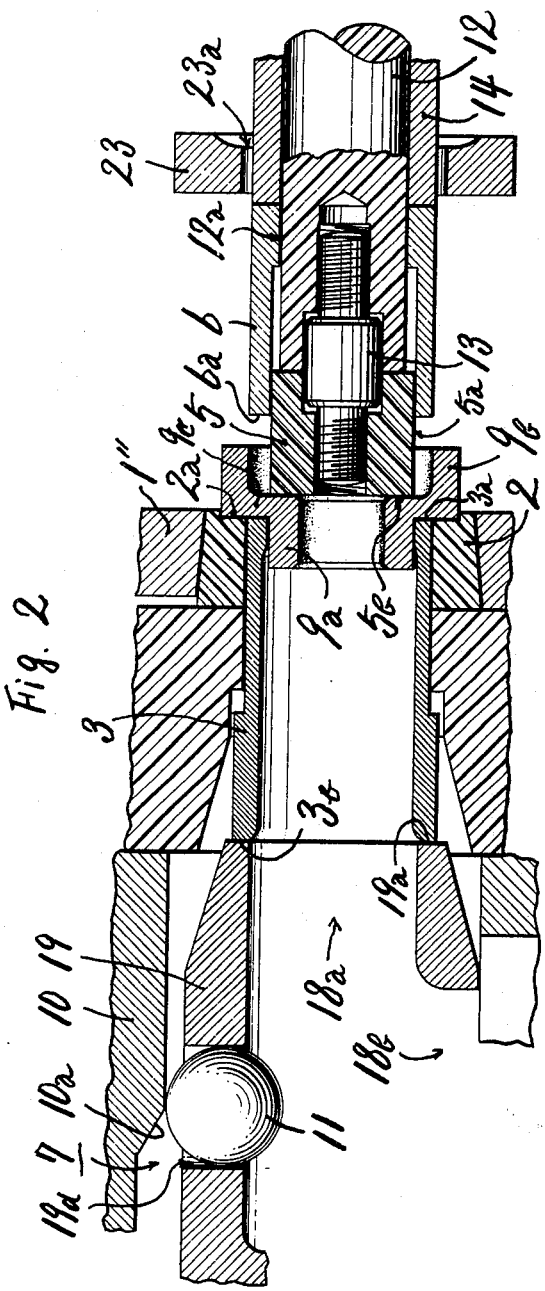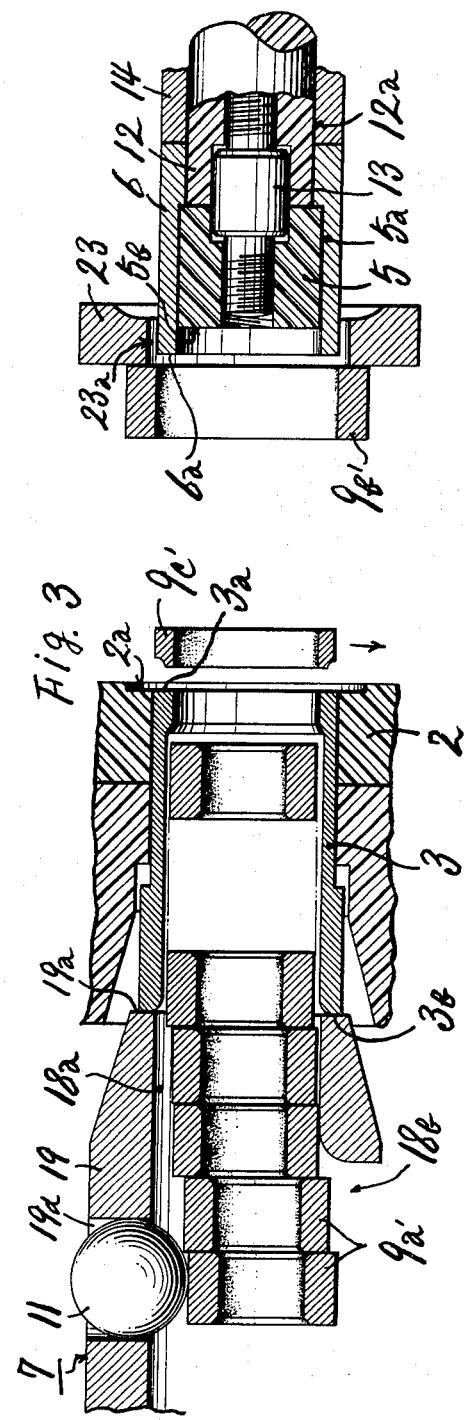

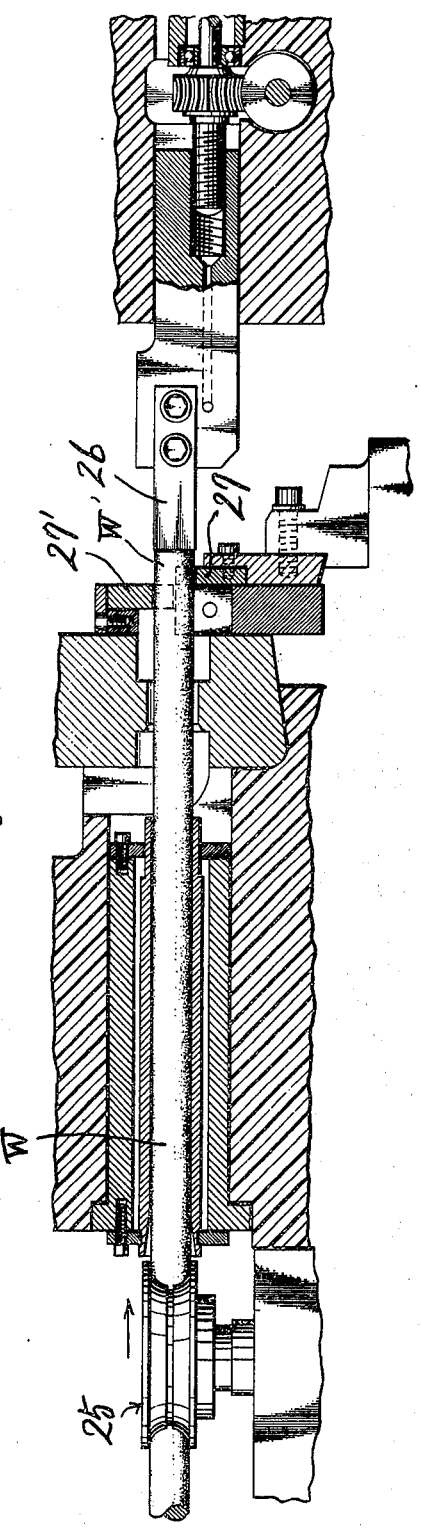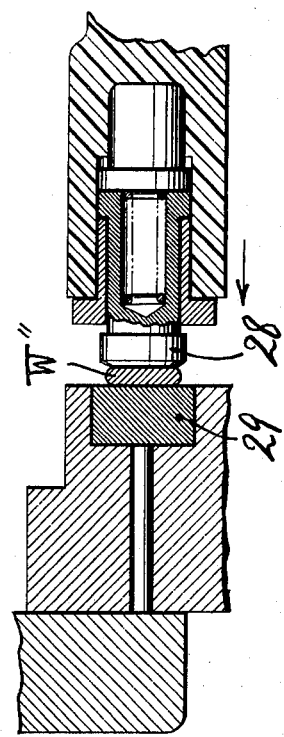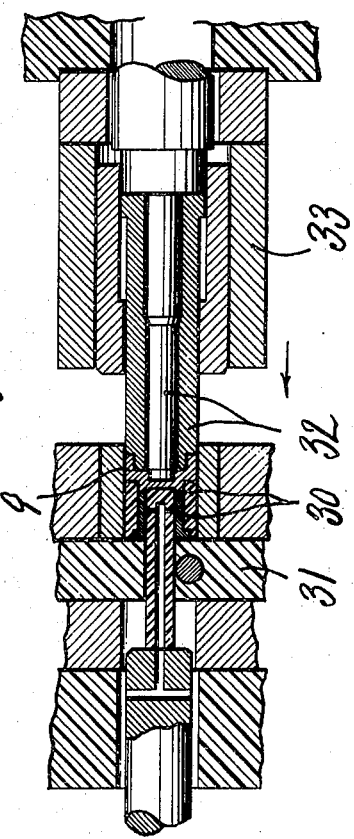

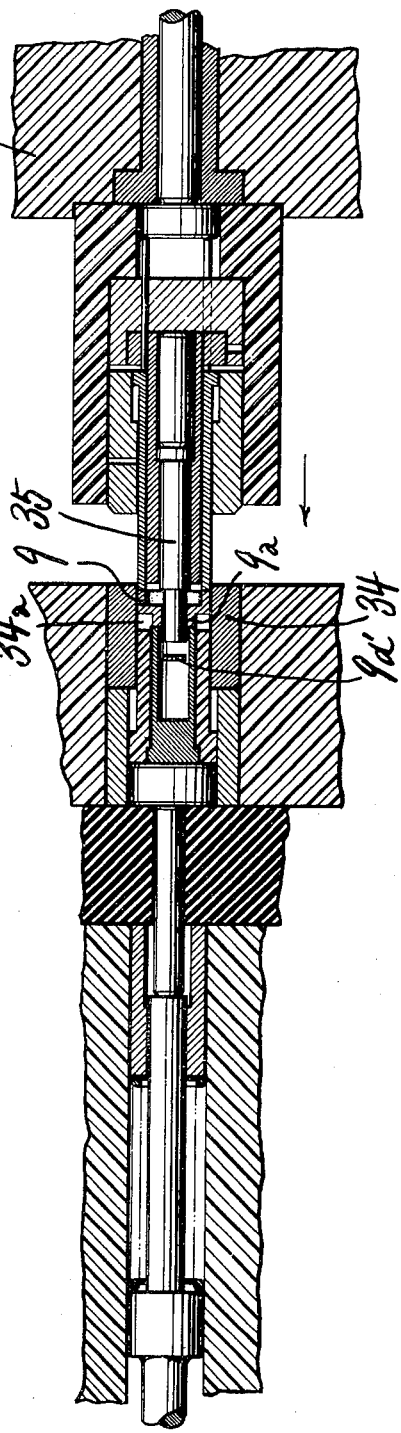
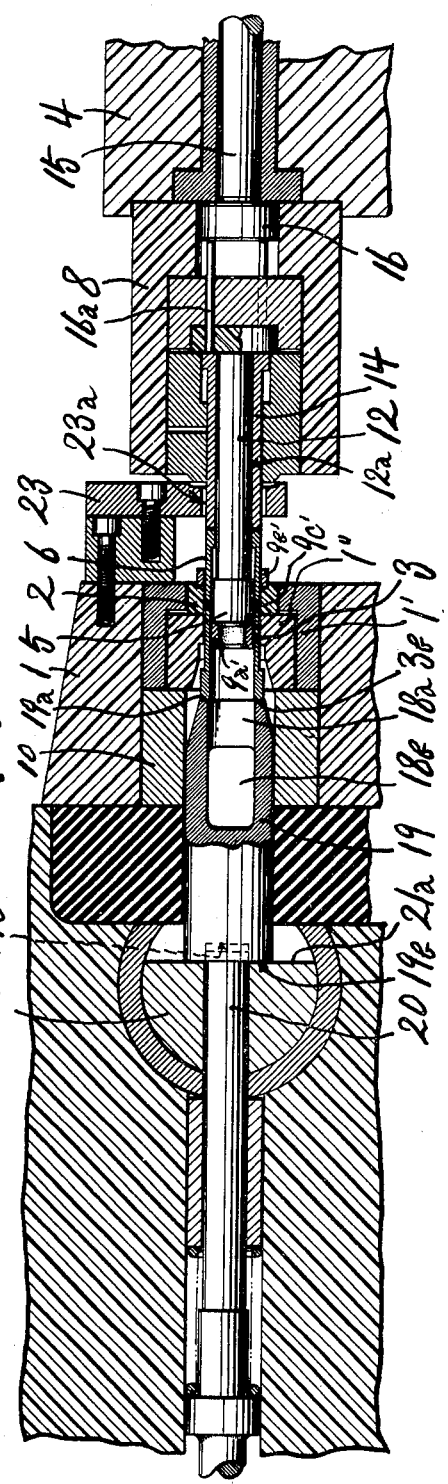

APPARATUS FOR SIMULTANEOUSLY PRODUCING INNER AND OUTER RINGS IN HOT FORMER

BACKGROUND OF THE INVENTION

The present invention relates to an apparatus for simultaneously producing an inner ring and an outer ring from a single workpiece including an annular portion and a smaller annular portion concentrically integrally projecting from the annular portion, the workpiece being formed by cutting a round bar to a specified dimension and pressing the resulting piece by forging machine.

It is already known to produce rings for example for the manufacture of ball bearings by a method other than cutting, namely by applying an axial shearing force to a blank prepared by press work and including large and small annular members in a steplike shape. With the known method, the large and small annular members joined together side by side in the axial direction are separated from each other at the junction. However, the method has the following drawbacks. One of the separated annular members has an outwardly projecting flange on the outer periphery of its end, whilst the other member has an inwardly projecting flange on the inner periphery of its end. Thus the method requires a subsequent process to remove the flanges to provide smooth peripheral surfaces having no projections. In addition, one of the separated annular members is forced into the die, followed by like annular members during continuous operation, with the result that a series of like members adhere to each other because of the hot work environment. The method therefore entails the necessity of separating these members after cooling.

SUMMARY OF THE INVENTION

An object of this invention is to provide an apparatus by which a workpiece including large and small annular members is punched, in two stages, by two pairs of inner and outer dies and punches to simultaneously separate the workpiece into three portions, namely an inner ring, an outer ring and an intermediate ring as a punched-out scrap.

Another object of this invention is to provide an apparatus capable of easily and accurately producing two separate annular members each having a smooth peripheral surface free of any flangelike projection.

Still another object of this invention is to provide an apparatus in which a returning rod is movable to actuate a cam and to thereby depress a rolling member in relation to the movement of one of the separated annular members being forced into the hollow portion of an inner ring die, so that a number of like annular members adhering to each other due to heat during continuous operation can be separated and withdrawn one by one.

Still another object of this invention is to provide an apparatus in which the aforesaid intermediate ring resulting from the separation of large and small annular members as a punched-out scrap can be forced out from the outer ring die for automatic removal in relation to the separating action.

BRIEF DESCRIPTION OF THE DRAWINGS

FIG. 1 is a side elevation in vertical section showing the principal part of an embodiment of the present invention for use in a hot former before a workpiece is punched;

FIGS. 2 and 3 are side elevations in vertical section showing the principal part of the same to illustrate the sequence of operations of the apparatus;

FIG. 4 is a side elevation in vertical section showing a cutting apparatus;

FIGS. 5 and 6 are side elevations in vertical section showing a forging apparatus;

FIG. 7 is a side elevation in vertical section showing an apparatus for forming an aperture;

FIG. 8 is a plan view in horizontal section taken along the line I—I in FIG. 1 and showing the workpiece immediately after it has been separated into an inner ring, an outer ring and an intermediate ring; and FIG. 9 is a view partly in section showing the steps of forming finished rings from a blank.

DESCRIPTION OF THE PREFERRED EMBODIMENT

With reference to FIGS. 1 to 3, a stationary base 1 is fixedly provided with an annular outer ring die 2 having a recess 2a for receiving an outer ring therein. An inner ring die 3 in the form of a hollow cylinder into which an inner ring portion 9a of workpiece 9 is fittable is inserted in the base 1 in axially slidable manner. Disposed in opposing relation to the dies 2 and 3 is a movable ram 4 having a mounting portion 8 which supports an inner ring punch 5 adapted to fit into the inner ring die 3 to punch out the inner ring portion 9a and an outer ring punch 6 adapted to fit into the outer ring die 2 in end-to-end opposing relation to the front end 3a of the inner ring die 3 to separate an intermediate portion 9c of workpiece 9 from its outer ring portion 9b. The outer ring punch 6 is fitted around the outer periphery 5a of the inner ring punch 5 and is axially slidable, such that the front end 6a of the punch 6 is movable forward and backward from the front end 5b of the inner ring punch 5. At the rear end 3b of the inner ring die 3, there is disposed means 7 which operates by the action of a cam member 10 to depress a rolling member 11 and to thereby drop a finished inner ring 9a', in operative relation to a pushing movement to return the inner ring die 3 from its retracted position after the inner ring portion 9a has been punched out.

The stationary base 1 is fixedly mounted on the main body of the present apparatus, whilst the movable ram 4 is movable in the axial directions of the inner and outer punches 5 and 6 by unillustrated drive means.

The inner ring punch 5 is fixed to the front end of a punch rod 12 by a bolt 13 which is threaded at its opposite ends. The rod 12 is mounted in the portion 8. The outer ring punch 6, in end-to-end contact with a slider tube 14, is fitted around the outer periphery 12a of the rod 12 and also around the outer periphery 5a of the inner ring punch 5. The outer ring punch 6 is movable by the movement of a pusher rod 15 through the slider tube 14 and a slider 16 having pins 16a. The pusher rod 15 is movable by an unillustrated cam mechanism. The mounting portion 8 is secured to the movable ram 4 by fastening bolts 17. The aforementioned means 7 for depressing the inner ring comprises the cam member 10, the rolling member 11 and a connecting rod 19 having a bore 18a communicating with the interior of the inner ring die 3 and a bore 18b downwardly extending at a right angle with the bore 18a. The cam member 10 has a slanting cam surface 10a facing a side portion of the rod 19, such that when the rod 19 is moved, the rolling member 11 is depressed. The connecting rod 19 is slidable in the stationary base 1 and has one end 19a in contact with the rear end 3b of the inner ring die 3 and the other end formed with a tapered portion 19a and a cavity 19c. The rolling member 19 is fitted in an opening 19d in an intermediate portion of the rod 19. A returning rod 20 and a movable member 21 are provided in the rear of the rod 19. The returning rod 20 is fitted in the cavity 19c of the rod 19. The rod 20, when moved, moves the rod 19 and the inner ring die 3. The movable member 21 has a slanting recessed portion 21a adapted for contact with the tapered portion 19b of the rod 19 and is movable upward and downward by a pivotal lever 22. A stopper 23 has an aperture 23a for passing the inner and outer ring punches 5 and 6 therethrough. Indicated at 24 is a chuck for holding the workpiece.

FIG. 4 shows the pincipal part of an apparatus for cutting a round bar W to a suitable dimension. The round bar W is first heated to a red-hot state by being passed through an unillustrated heater, sent forward by a feeder 25 into contact with a plate 26 for the determination of dimension, and cut to the specified dimension by cutter edges 27 and 27′.

FIG. 5 shows the principal part of a forging apparatus disposed adjacent to the cutting apparatus. A piece W′ cut off by the cutting apparatus is gripped by a chuck (not shown) and pressed by a hammer 28 against a fixed support 29 and thereby deformed to a blank W″ in the form of a disk.

FIG. 6 shows the principal part of an apparatus for forming the workpiece 9 including the annular portion 9b and the smaller annular portion 9a concentrically integrally projecting therefrom. Female dies 30 for shaping the annular portions are fixedly mounted on a stationary member 31, and male dies 32 for shaping the annular portions are mounted on a movable member 32. The pressed blank W″ is brought to and placed into the female dies 30 by a chuck and pressed into the workpiece 9 by the male dies 32.

FIG. 7 shows the principal part of an apparatus for forming an aperture in the end portions 9d of inner ring (small annular portion 9a) of the workpiece 9 by punching. The workpiece 9 is fitted in the recessed portion 34a of a stationary member 34 and the projection 9d is cut out by a punch 35.

With reference to FIGS. 1 to 3, the workpiece 9 prepared as above is placed by the chuck 24 into the recess 2a of the outer ring die 2, and the pivotal lever 22 is raised to fix the movable member 21 to hold the inner die 3 in position. Subsequently the movable ram 4 is driven by the cam mechanism toward the dies 2 and 3. The inner ring punch 5 comes into contact with the inner ring portion 9a of the workpiece 9, and the inner ring die 3 and the inner ring punch 5 thereafter coact to separate the inner ring portion 9a from the intermediate portion 9c. The inner ring portion 9a thus made into a finished inner ring 9a′ is forced into the inner ring die 3. Simultaneously with this, the pivotal lever 22 lowers to depress the movable member 21, rendering the inner die 3 retractable. At the same time, the front end 6a of the outer ring punch 6 comes into contact with the intermediate portion 9c. The outer ring punch 6 and the outer ring die 2 thereafter coact to separate the intermediate portion 9c from the outer ring portion 9b. The portion 9c is forced into the outer ring die 2. The movable ram 4 is then retracted, whilst the pusher rod 15 is driven by the cam mechanism (not shown) toward the dies 2 and 3 to move the outer ring punch 6 forward through the slider 16 and the tube 14, whereby the intermediate ring 9c′ on the outer periphery 5a of the inner ring punch 5 is slipped off the inner ring punch 5 and is allowed to remain in the outer ring die 2. As the movable ram 4 continues to retract, the outer ring 9b′ fitting around the outer ring punch 6 comes into contact with the front of the stopper 23, whereupon the ring 9b′ drops under gravity. Subsequently, a cam mechanism moves the returning rod 20 toward the punches 5 and 6, thereby forcing the connecting rod 19 and inner ring die 3 toward the same direction. The inner ring die 3 therefore pushes out the intermediate ring 9c′ forward from the outer ring die 2 and causes the ring 9c′ to drop. On the other hand, the movement of the connecting rod 19 brings the rolling member 11 into contact with the cam surface 10a of the cam member 10, which in turn depresses the member 11. Consequently, the foremost of like inner rings 9a′ previously separated and positioned side by side in the bore 18a communicating with the interior of the inner ring die 3 is separated from the others and drops through the downwardly extending bore 18b. In this way, the inner rings drop one by one.

According to the invention described above, the workpiece including an annular portion and a smaller annular portion projecting concentrically from the portion and integral therewith is separated into an inner ring and an outer ring by inner and outer dies and inner and outer punches. In relation to this operation, the rolling member causes the inner ring to drop from the apparatus. Thus the finished inner and outer rings and the intermediate ring as a scrap can be separated at a single stroke of the movable ram. The inner rings accumulated in the inner ring die as adhered together due to the hot treatment can be separated one by one by the rolling member actuated by the movement of the returning rod, while the intermediate ring is automatically removable from the outer ring die.

The present invention is not limited to the embodiment described above but can be variously modified within the scope of its technical concept. Such modifications are all to be covered by the appended claims.

What is claimed is:

1. An apparatus for use in a hot former to simultaneously produce an inner ring and an outer ring by cutting an elongated continuous steel round bar to a specified dimension, pressing the resulting piece by a forging machine into a workpiece including an annular portion and a smaller annular portion concentrically integrally projecting therefrom and separating the workpiece into a large annular member and a small annular member, the apparatus comprising an annular outer ring die fixedly mounted on a stationary base and having a recess for receiving the outer ring therein, an inner ring die in the form of a hollow cylinder into which the inner ring is fittable and inserted in the base in axially slidable manner, a movable ram disposed in opposing relation to the dies and having a mounting portion, an inner ring punch supported by the mounting portion and fittable into the inner ring die to punch out the inner ring, and an outer ring punch supported by the mounting portion and fittable into the outer ring die in end-to-end opposing relation to the inner ring die to separate an intermediate ring from the outer ring, the outer ring punch being fitted around the outer periphery of the inner ring punch and axially slidable, the outer ring punch having a front end movable forward and backward from the front end of the inner ring punch.

2. An apparatus as defined in claim 1 wherein the inner ring die is provided in the rear of its hollow portion with means which causes a cam to depress a rolling member in operative relation to a pushing movement to return the inner ring die from its retracted position after the inner ring has been punched out, whereby the finished inner ring is separated from like inner ring thermally adhered thereto and is allowed to drop.

3. An apparatus as defined in claim 1 wherein the inner and outer dies and the inner and outer punches are arranged stepwise respectively, and the steplike dies and steplike punches effect punching in two stages, whereby the inner ring is punched out first and the outer ring is thereafter punched out with the intermediate ring simultaneously removed from the outer ring as a scrap.

4. An apparatus as defined in claim 1 wherein the inner ring and the outer ring are so separated that the sheared surfaces thereof are flush with the outer peripheral surface of the inner ring and with the inner peripheral surface of the outer ring respectively.

5. An apparatus as defined in claim 1 wherein the intermediate ring is pushed into the outer ring die and punched out as a scrap and is thereafter forced out from the outer ring die by the inner ring die when the inner ring die is returned.

* * * * *